United States Patent
Burgos

(10) Patent No.: US 6,776,393 B2
(45) Date of Patent: Aug. 17, 2004

(54) TORQUE BOOSTER FOR VALVE OPERATION

(76) Inventor: Glenn D. Burgos, 446 Hoffman La., Hauppauge, NY (US) 11788

( * ) Notice: Subject to any disclaimer, the term of this patent is extended or adjusted under 35 U.S.C. 154(b) by 170 days.

(21) Appl. No.: 10/162,247

(22) Filed: Jun. 5, 2002

(65) Prior Publication Data
US 2003/0226995 A1 Dec. 11, 2003

(51) Int. Cl.⁷ .............................................. F16K 31/53
(52) U.S. Cl. .................. 251/250.5; 251/251; 192/93 R; 74/333
(58) Field of Search .............................. 251/250.5, 248, 251/251, 229; 192/93 R, 93 A, 69.8; 74/352, 333

(56) References Cited

U.S. PATENT DOCUMENTS

| | | | | |
|---|---|---|---|---|
| 3,847,372 A | * | 11/1974 | Litchfield | .................... 251/251 |
| 4,846,222 A | * | 7/1989 | Jang | ....................... 137/624.12 |
| 5,005,805 A | * | 4/1991 | Morris et al. | ............. 251/249.5 |
| 6,446,660 B1 | * | 9/2002 | Goni Usabiaga | ........... 251/248 |

* cited by examiner

Primary Examiner—John Bastianelli
(74) Attorney, Agent, or Firm—Levine & Mandelbaum

(57) ABSTRACT

A torque booster for operating a valve during initial opening and closing movements of the valve. The torque booster includes a rotatable valve operating stem, a rotatable operator shaft, a gear reduction unit, and a coupling for temporarily operatively interposing the gear reduction unit between the shaft and the stem during initial rotation of the shaft in a valve-opening or a valve-closing direction, so that during the temporary period the stem rotates at a fraction of the speed of the shaft. After the temporary torque-boost period, the speed of rotation of the stem increases with respect to the speed of rotation of the shaft, preferably so that the speeds of rotation of the stem and shaft approach or equal a ratio of one-to-one.

17 Claims, 8 Drawing Sheets

TORQUE BOOSTER FOR VALVE OPERATION

BACKGROUND OF THE INVENTION

This invention relates to operation of valves, especially those used in difficult or corrosive locations or environments, such as marine valves.

Such valves usually require application of greater torque to initially open or initially close the valve than the further effort required to complete the opening or closing of the valve. Upon opening a fully closed valve, a relatively high torque is required to overcome the pressure differential across the valve, and to overcome the friction of the closed-valve parts. An increased torque is also required to initially move an open valve toward a closed position because a valve which has been open for some period of time often experiences a build-up of residues on the relatively movable parts of the valve which makes initial movement of those parts difficult.

In order to obtain a torque boost, it is usually necessary to slow the movement of the movable valve part with respect to the movement of the valve operator, which may be a hand wheel for valves which are manually operated. If there is a large reduction in speed of rotation of the movable valve part, so as to obtain an accompanying large input torque to the valve, the operator, such as the hand wheel, must be turned many times in order for the valve to be completely opened or completely closed.

Therefore, it would be advantageous to have an arrangement whereby a high torque can be initially applied to a valve during its initial opening or closing movement, followed by a lower ratio of speeds of the valve operator and valve parts, accompanied by a necessarily lower torque. In this way, high torque is available for overcoming the initial resistance of a valve to opening or closing, but a higher speed of opening or closing movement is available during the remainder of the opening or closing movement of the valve.

BRIEF SUMMARY OF THE INVENTION

It is an object of the present invention to provide a torque booster for operating a valve which temporarily boosts the torque applied to a valve during initial opening and closing of the valve, but thereafter decreases the torque so that the speed ratio between the valve operator and the moving valve part is reduced, whereby the moving valve part more quickly responds to movement of the operator to complete opening or closing of the valve.

It is another object of the invention to provide such a torque booster including a gear reduction unit, and coupling means for temporarily operatively interposing the gear reduction unit between the valve operator and the valve during initial movement of the valve operator in a valve-opening or valve-closing direction, the coupling causing the gear reduction unit to be bypassed during further movement of the valve operator.

Additional objects and features of the invention are set forth in the following description, in which reference is made to the accompanying drawings.

DESCRIPTION OF THE PREFERRED EMBODIMENT

Figure 1:
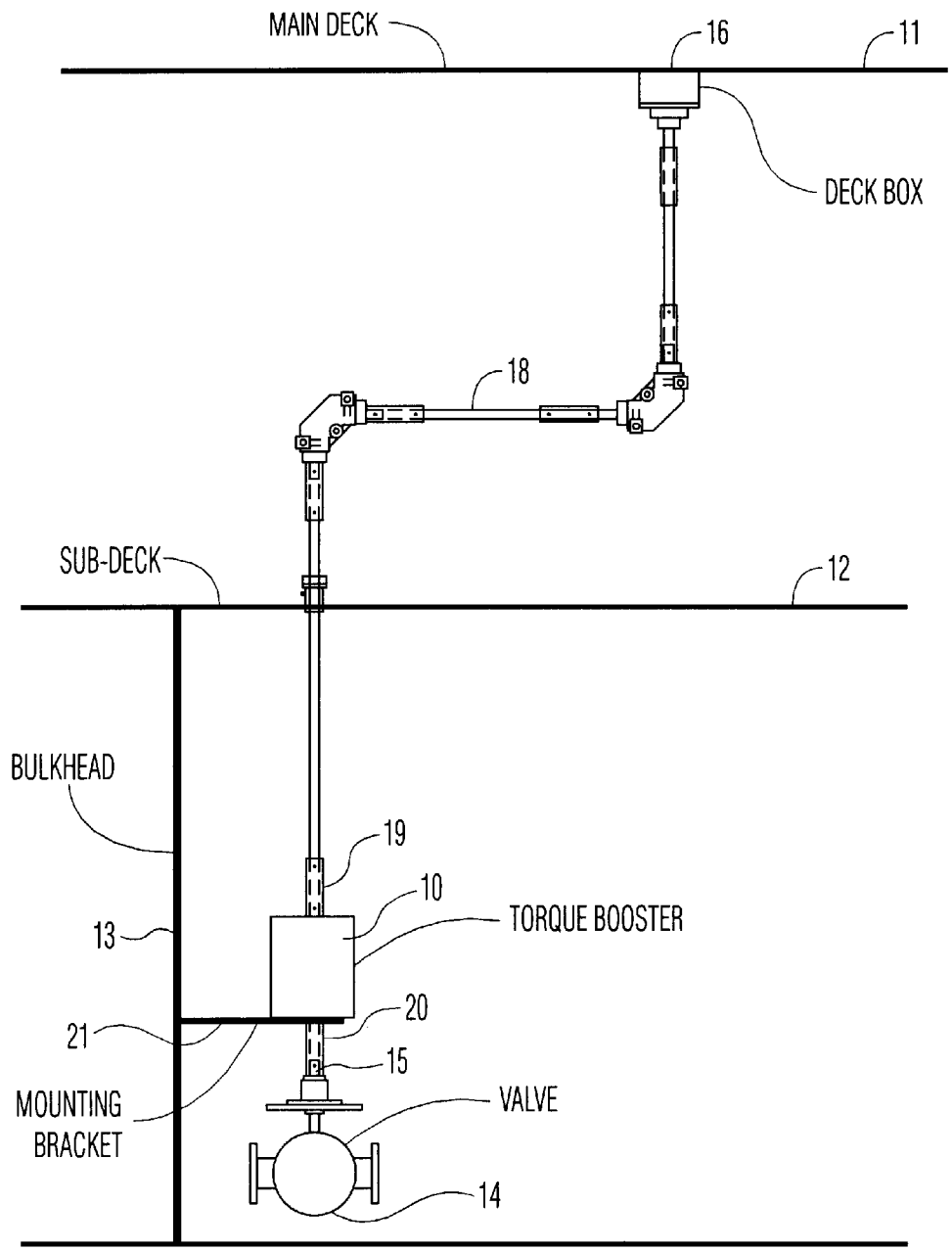
FIG. 1 is an environmental view showing the location of a torque booster, according to the present invention, in a typical valve operation installation.

FIG. 1 schematically illustrates a torque booster 10 according to the present invention, within an installation for operating a marine valve. However, it is understood that use of the torque booster is not limited to marine environments, but has utility in any type of installation wherein an initial boosting torque is desirable for opening or closing a valve.

FIG. 1 is a cross section through a marine vessel having a main deck 11, a sub-deck 12, and a bulkhead 13. Within the interior of the vessel is a valve 14 having a rod 15 which is rotated in one direction to open the valve and in the opposite direction to close the valve.

Flush with the surface of main deck 11 is a conventional deck box 16, such as that shown in U.S. Pat. No. 6,112,694. Within the deck box is a fitting for actuation by an operator, such as a wrench, or alternatively a hand wheel 17 (see FIG. 2) may be used. The wrench or hand wheel is rotated in opposite directions to open and close, respectively, valve 14. While a hand wheel 17 is used for manual operation of the valve, an automatic mechanism could be employed.

A linkage 18, below main deck 11, transmits rotary motion of hand wheel 17 to an operator shaft 19 of torque booster 10, the latter being supported on a mounting bracket 21. A valve operating stem 20 of the torque booster, coaxial with operator shaft 19, connects torque booster 10 to rod 15 of valve 14.

Figure 2:
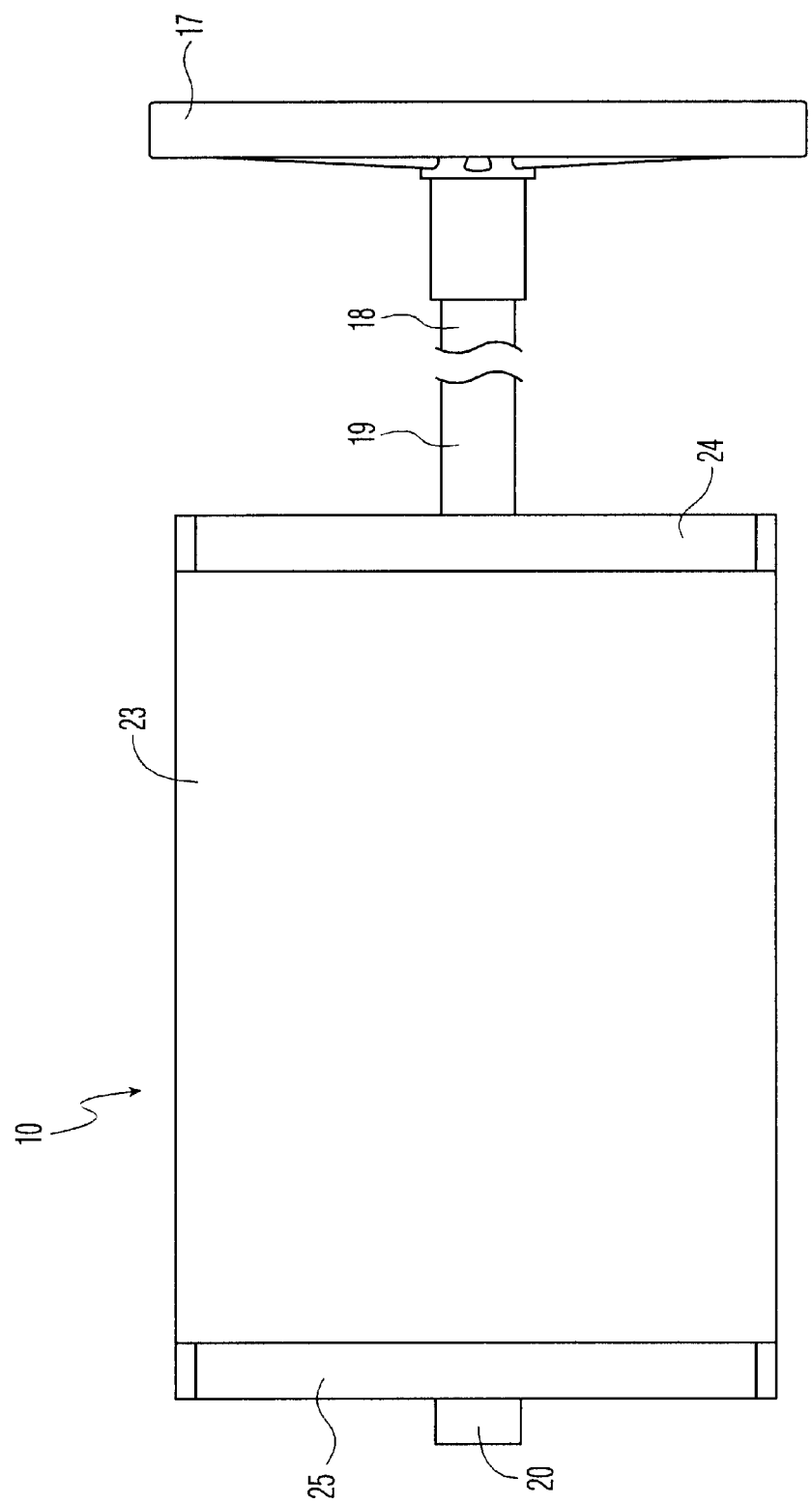
FIG. 2 is a side elevational view of a torque booster according to the present invention.

With reference to FIG. 2, the torque booster 10 chosen to illustrate the present invention includes a hollow cylindrical housing 23, the housing being closed by two end caps 24 and 25. Operator shaft 19 projects rotatably through end cap 24, and valve operating stem 20 projects rotatably through end cap 25. The shaft and stem may be suitably supported, such as by a bushing 26 (FIG. 3)

Figure 3:
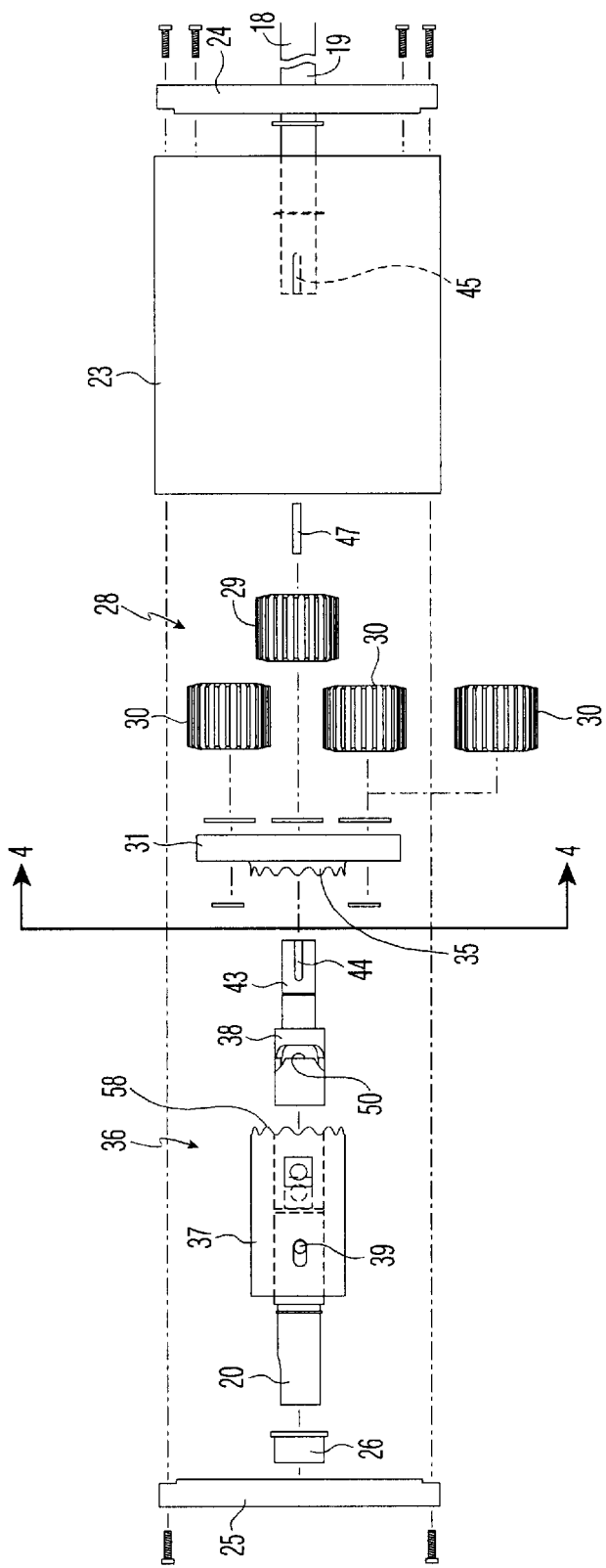
FIG. 3 is a schematic, exploded view of a torque booster according to the present invention.
Figure 4:
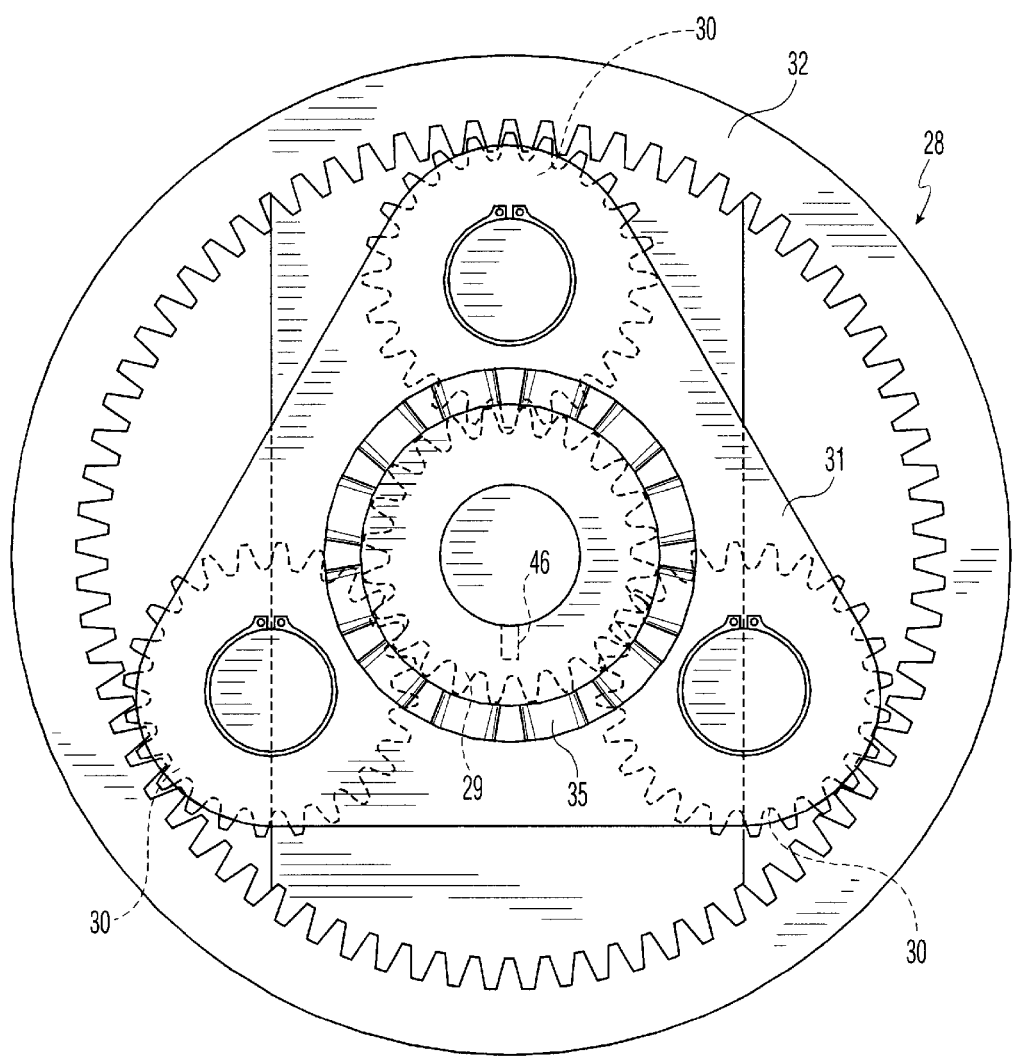
FIG. 4 is a transverse cross-sectional view of the torque booster along line 4—4 of FIG. 3.

The torque booster mechanism within housing 23 is shown in FIGS. 3 and 4. The mechanism includes a gear reduction unit 28 which may be in the form of a planetary gear arrangement. The gear reduction unit includes a central spur gear 29, coaxial with shaft 19 and stem 20, and three planet gears 30. Planet gears 30 are rotatably carried by a generally triangular support plate 31. Each planet gear 30 is located between, and meshes with, central gear 29 and an annular gear 32 coaxial with central gear 29 and fixed with respect to housing 23. It will be appreciated that rotation of central gear 29 causes rotation of planet gears 30 and hence rotation of support plate 31, the speed of rotation of the support plate being slower than that of central gear 29.

Planet gears 30 are mounted on one face of plate 31, and projecting from the other face of the plate is a driving crown gear 35. Crown gear 35 is coaxial with shaft 19 and stem 20, as well as with central gear 29. In addition, crown gear 35 is fixed to, and rotates with, support plate 31.

Figure 5:
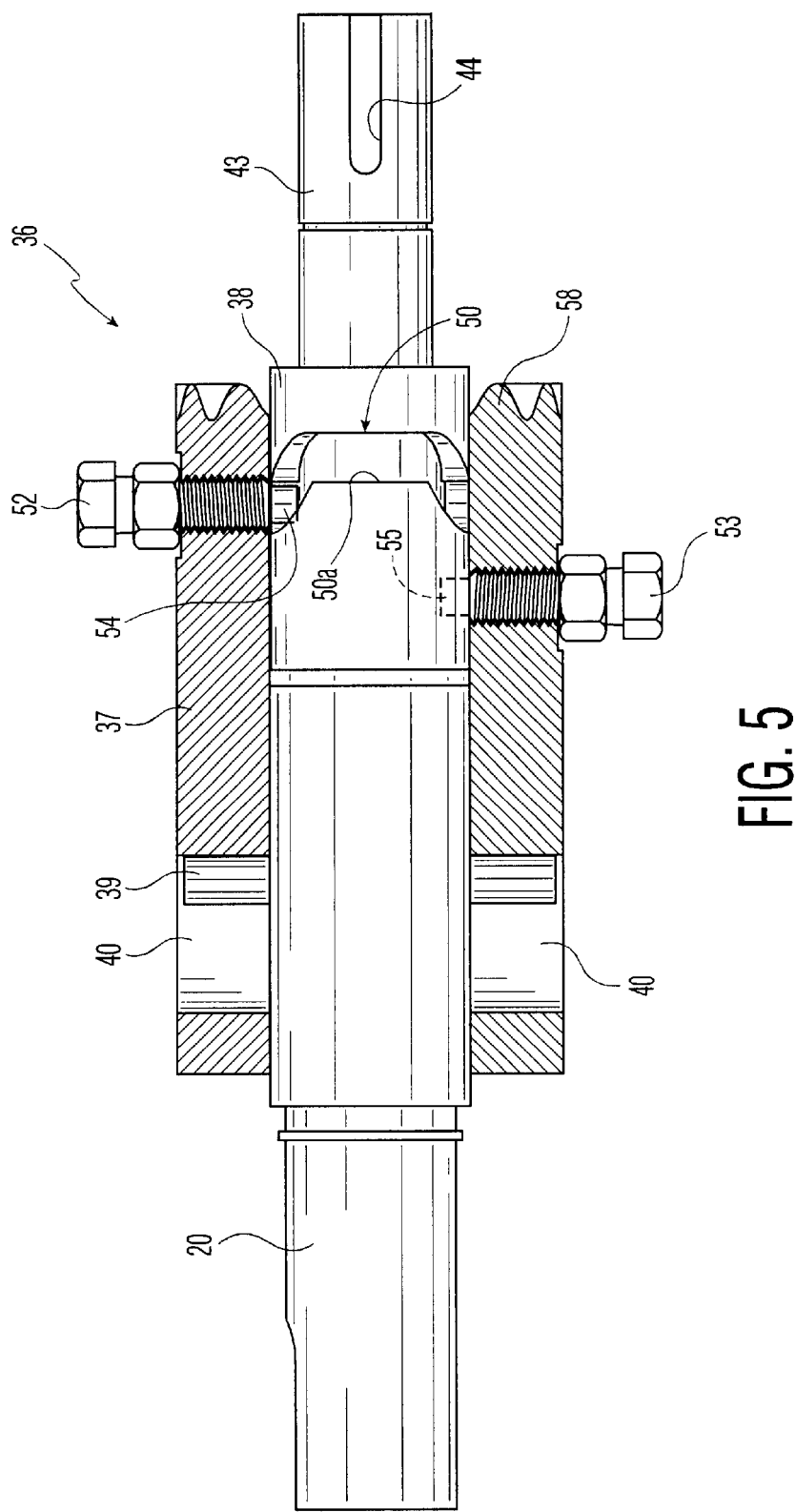
FIG. 5 is an axial cross-sectional view of the coupling of the torque booster, with the parts in one relative position.
Figure 6:
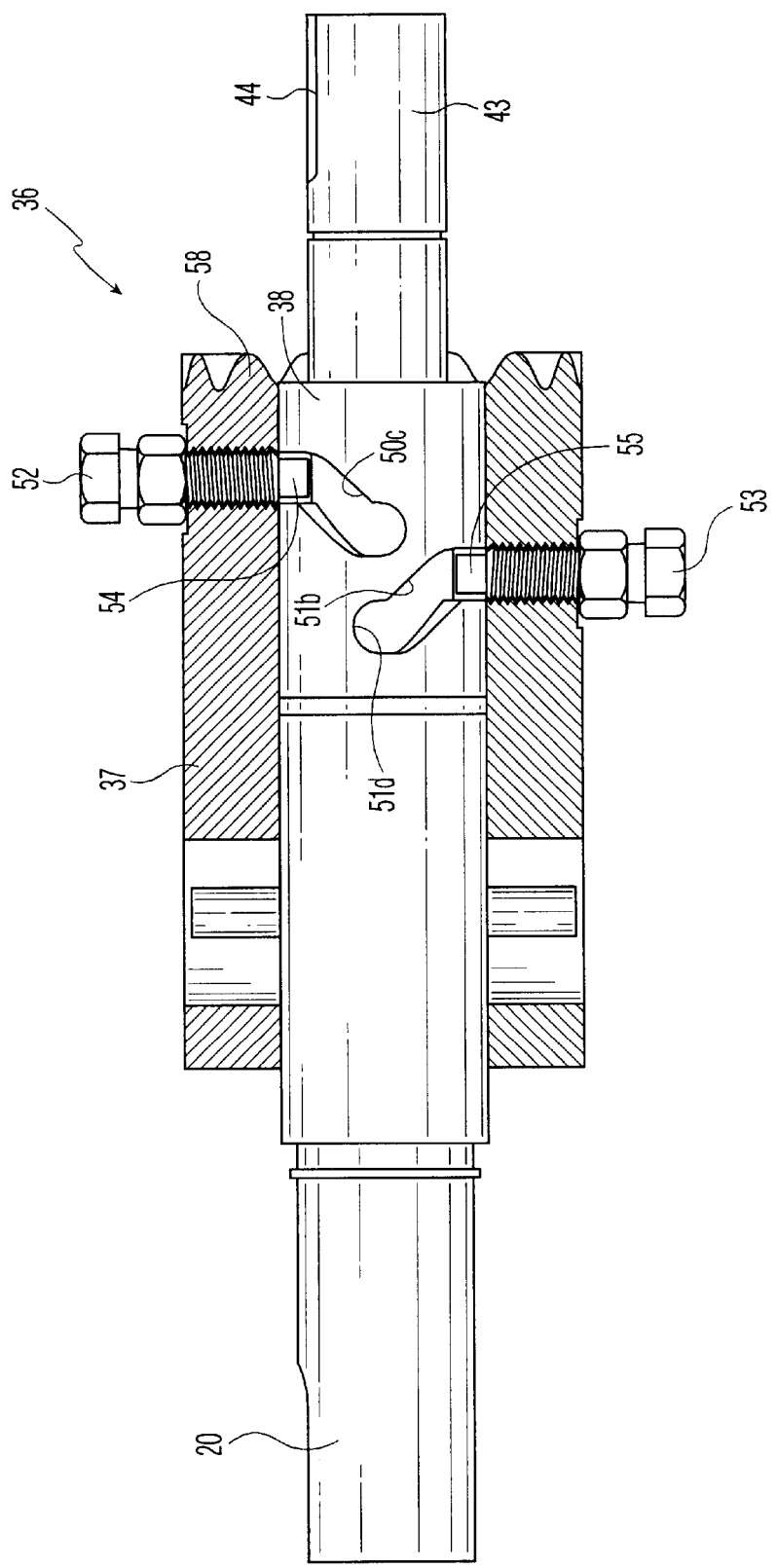
FIG. 6 is a view similar to FIG. 5 showing the parts of the coupling in a different relative position.
Figure 7:
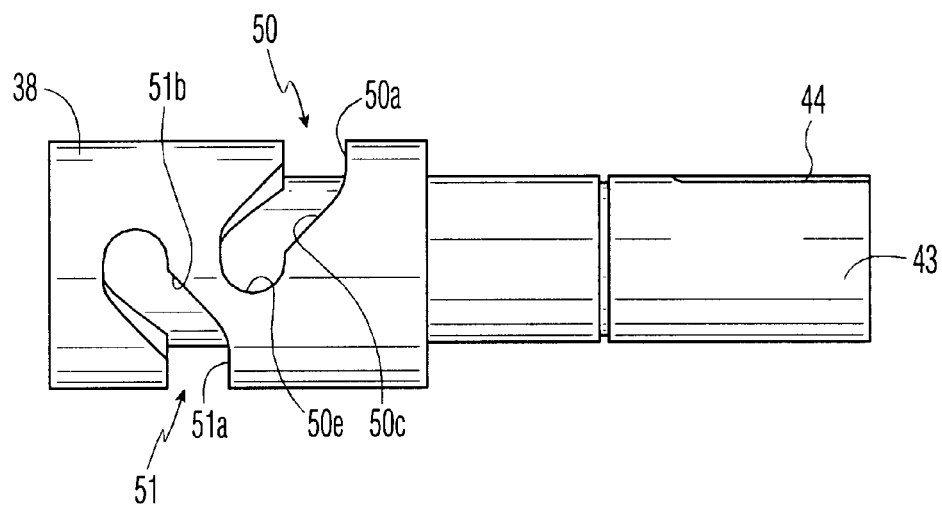
FIG. 7 is a side elevational view of the piston of the coupling.
Figure 8:
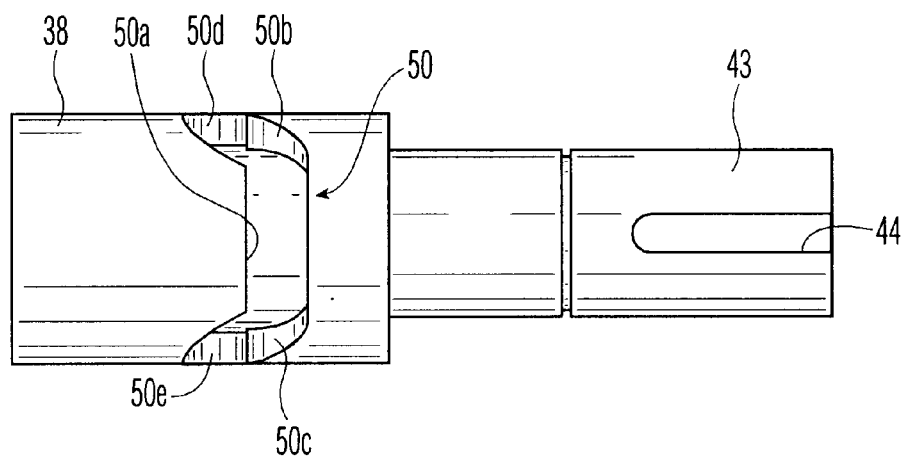
FIG. 8 is a view similar to FIG. 7 showing the piston rotator about its axis by 90°.

A coupling 36 (FIGS. 3, 5, and 6) is located between plate 31 and valve operating stem 20. The coupling includes a hollow cylindrical sleeve 37 accommodating a piston 38 which is both slidable and rotatable with respect to sleeve 37. The sleeve also slideably accommodates one end of valve operating stem 20. Stem 20 is furnished with a pin 39, projecting diametrically through stem 20, the two ends of the pin being slidable within two slots 40 formed in sleeve 37. As a result of this arrangement, sleeve 37 can slide axially with respect to stem 20, and rotational movement of sleeve 37 is transmitted through pin 39 and slots 40 to stem 20. At its end facing support plate 31, sleeve 37 is formed with a driven crown gear 58 adapted to mesh with the driving crown gear 35 carried by plate 31.

Piston 38 has an extension 43 (FIGS. 5–8) formed with a keyway slot 44. A similar keyway 45 is formed in operator shaft 19, at its end within housing 23. Yet another keyway 46 (FIG. 4) is formed in the interior wall of central gear 29. When the parts are assembled, a single key 47 (FIG. 3) is accommodated within all three keyways 44, 45, and 46 so that rotation of operator shaft 19 causes rotation of central gear 29 and rotation of piston 38.

Piston 38 is formed with two camming grooves 50 and 51 (FIGS. 5–8). Camming groove 50 has a central dwell section 50a substantially perpendicular to the axis of coupling 36, and two ramp sections 50b and 50c, each extending at an acute angle to the axis of the coupling. Ramp section 50b extends from one end of 50d (FIG. 8) of the groove to one end of dwell section 50a, and ramp section 50c extends from the other end 50e of groove 50 to the opposite end of dwell section 50a, the ramp sections converging from the ends of the groove toward the dwell section. Similarly, groove 51 includes a dwell section 51a and ramp sections 51b and 51c (not shown), similar in all respects to groove 50, except that groove 51 is located 180° from groove 50 around the surface of piston 38.

It will be seen that in the present example, each groove 50 and 51 has a length less than the full circumference of piston 38. As illustrated, each groove extends for an angular distance of a little more than 180°.

Cylindrical sleeve 37 carries two diametrically opposed set screws 52 and 53, each of which is threaded into an internally threaded hole extending through the thickness of the sleeve wall. At the inner end of screw 52 is a follower pin 54 slidably accommodated within groove 50, and at the inner end of screw 53 is a follower pin 55 slidably accommodated within groove 51.

Figure 9A:
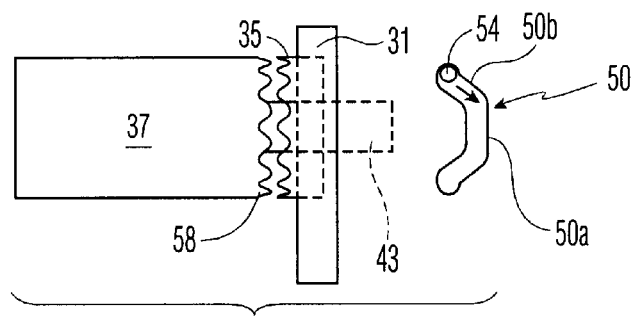
FIGS. 9a–9d are schematic views showing relative movement of the coupling and the crown gears for temporarily operatively interposing the gear reduction unit between the valve operator and the valve.
Figure 9B:
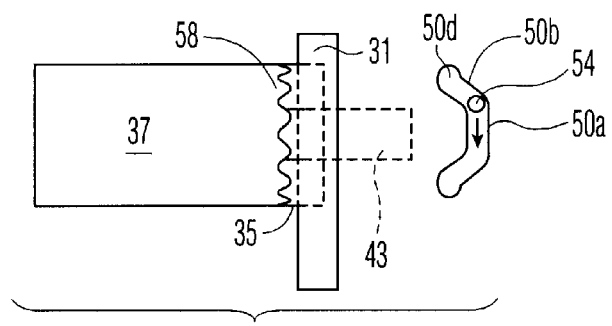

Operation of the torque booster will now be explained with reference to FIGS. 5, 6, and 9a–9d. Assume the parts are in the condition shown in FIGS. 5 and 9a, the valve 14 is open, and it is desired to close the valve. Rotation of hand wheel 17 in a valve-closing direction rotates operator shaft 19 which, through key 47 and extension 43, rotates piston 38. At the same time, key 47 also rotates central gear 29 as well as the rest of the gear reduction unit 28 so as to cause rotation of support plate 31 and crown gear 35. However, at the outset, rotation of the gear reduction unit 28 and crown gear 35 have no effect on closing of the valve. Instead, the initial rotation of piston 38 moves follower pin 54 along ramp 50b of camming groove 50 from the relative position shown in FIG. 9a to the position shown in FIG. 9b. A similar relative movement takes place with respect to follower pin 55 and groove 51. This movement causes sleeve 37 to slide axially from the position shown in FIG. 5 to that shown in FIG. 6, thereby bringing crown gears 58 and 35 into meshing relationship, as indicated in FIG. 9b.

Figure 9C:
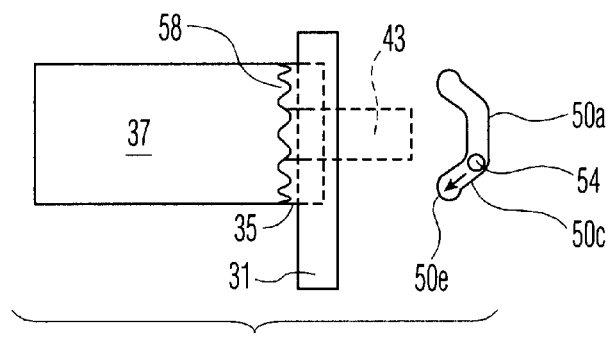

At this point, further rotation of hand wheel 17 in the valve-closing direction causes relative movement of follower pin 54 through the dwell section 50a of groove 50 to the position shown in FIG. 9c. During this movement of pin 54 within dwell section 50a, crown gears 58 and 35 remain in meshing relationship, and hence rotary motion of operator shaft 19 is transmitted via gear reduction unit 28, plate 31, and the meshing crown gears to sleeve 37. Rotation of sleeve 37 is transmitted by pin 39 and slots 40 to valve operating stem 20.

Because this motion is transmitted by means of the gear reduction unit 28, sleeve 37, and hence stem 20, rotate at a speed slower than the speed of operator shaft 19. The ratio of the speed of stem 20 with respect to shaft 19 will depend upon the gear reduction ratio of unit 28. A ratio of four to one has been found useful, but any appropriate gear reduction ratio may be used. The speed reduction of stem 20 is accompanied by an increase of torque applied by stem 20 to valve rod 15, the increase in torque being proportional to the reduction of speed of stem 20. In this way, a torque boost has been introduced during the initial closing movement of valve 14.

Figure 9D:
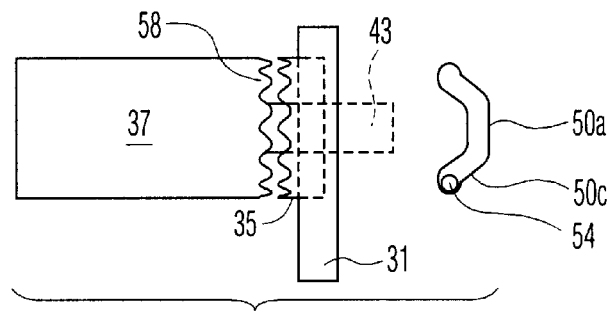

Further rotation of hand wheel 17 in the valve-closing direction causes relative movement of follower pin 54 from the end of dwell section 50a along ramp section 50c to the end 50e of groove 50, as shown in FIG. 9d. During this movement, the cooperation of follower pin 54 and groove ramp section 50c slides sleeve 37 from its position shown in FIGS. 6 and 9c back to its original position shown in FIGS. 5 and 9d. In this condition, crown gears 35 and 58 have been disengaged, as a result of which gear reduction unit 28 is now bypassed. Continued rotation of hand wheel 17 and hence operator shaft 19 directly rotates extension 43, through key 47, and piston 38. Rotation of the piston causes rotation of sleeve 37 as a result of follower pins 54 and 55 being seated against the ends of their respective grooves 50 and 51. Rotation of sleeve 37 produces rotation of valve operating stem 20 due to the engagement of pin 39 within grooves 40. Since operator shaft 19 is now directly driving valve operating stem 20, without the intercession of gear reduction unit 28, there is no longer a torque boost applied to stem 20, and the latter rotates at the same speed as shaft 19.

When it is desired to open the valve, the operation just described is reversed. Hand wheel 17 is rotated in the valve-opening direction causing relative movement of pin 54 from the position shown in FIG. 9d to that shown in FIG. 9c, thereby meshing crown gears 35 and 58. In this way, gear reduction unit 28 is brought into play introducing a torque boost between shaft 19 and stem 20. The torque boost lasts during further rotation of shaft 19 as pin 54 moves from its FIG. 9c position to that shown in FIG. 9b. Continued rotation of shaft 20 than moves pin 54 to the position shown in FIG. 9a, causing crown gears 35 and 58 to disengage, thereby bypassing the gear reduction unit 28.

Throughout the rotation of shaft 19, gear reduction unit 28 and plate 31 rotate constantly, but the gear reduction unit is interposed between the shaft 19 and stem 20 only when crown gears 35 and 58 are engaged.

In the illustrative embodiment of this invention just described, two camming grooves 50 and 51 are shown cooperating with two follower pins 54 and 55. The device can operate with only a single groove 50 and single follower pin 54. However, it has been found that use of two grooves and two followers arranged 180° apart stabilizes operation of the unit. Also, while the camming grooves have been shown in piston 38 and the follower pins carried by sleeve 37, that arrangement could be reversed, with the grooves in the interior surface of the sleeve and the pins projecting from the piston.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A torque booster for operating a valve during initial opening and closing movements thereof, comprising:
   a rotatable valve operating stem,
   a rotatable operator shaft,
   a gear reduction unit, and
   coupling means for temporarily operatively interposing the gear reduction unit between the shaft and the stem during initial rotation of the shaft in a valve-opening or a valve-closing direction,
   whereby during said temporary period the stem rotates at a fraction of the speed of the shaft.

2. A torque booster as defined in claim 1 wherein after said temporary period, the speed of rotation of the stem increases with respect to the speed of rotation of the shaft.

3. A torque booster as defined in claim 1 wherein after said temporary period, the speed of rotation of the stem equals the speed of rotation of the shaft.

4. A torque booster as defined in claim 1 including a driving gear rotatable in response to rotation of the operator shaft, through the gear reduction unit, at a speed less than that of the shaft, a driven gear rotatable with the valve operating stem and normally spaced from the driving gear, and the coupling being responsive to the initial rotation of the shaft for moving the drawing and driven gears relative to each other to bring them into meshing relationship.

5. A torque booster as defined in claim 4 wherein further rotation of the shaft in either direction causes the coupling to disengage the driving and driven gears.

6. A torque booster as defined in claim 5 wherein the coupling comprises a driver coupling element rotatable with the operator shaft, a driven coupling element rotatable with the valve operating stem, and means interengaging the two coupling elements for moving them axially with respect to each other to alternatively produce meshing and disengagement of the driving and driven gears.

7. A torque booster as defined in claim 6 wherein the driven coupling element is a hollow cylindrical sleeve, and the driver coupling element is a piston axially slidable and rotatable within the sleeve.

8. A torque booster as defined in claim 6 wherein the interengaging means permits relative rotation between the sleeve and piston to only a limited degree.

9. A torque booster as defined in claim 8 wherein at the end of permissible relative rotation between the coupling elements, further rotation of the driver coupling element in the same direction transmits rotational movement from the driver coupling element to the driven coupling element.

10. A torque booster as defined in claim 9 wherein one of the sleeve and piston is formed with a camming groove, the groove having a central dwell section substantially perpendicular to the axis of the coupling, and two ramp sections each extending, at an acute angle to the coupling axis, from one end of the groove to one end of the dwell section, the ramp sections converging from the ends of the groove toward the dwell section, and a follower pin carried by the other of the sleeve and piston, the follower pin being accommodated within the camming groove.

11. A torque booster as defined in claim 10 wherein the groove extends for an arcuate distance, around the sleeve or piston, for less than 360°.

12. A torque booster as defined in claim 10 including two camming grooves angularly offset from each other by 180°.

13. A torque booster as defined in claim 1 wherein the gear reduction unit includes a planetary gear arrangement comprising a central gear rotatable with the operator shaft, planet gears meshing with the central gear, and means for transmitting movement of the planetary gears to the coupling means.

14. A torque booster as defined in claim 13 including a rotatable support, each of the planet gears being rotatably carried by the support, a driving gear rotatable with the support, and a driven gear rotatable with the coupling means and engageable with the driving gear.

15. A torque booster as defined in claim 14 wherein the support is rotatable coaxially with the central gear, the driving gear is a crown gear coaxial with the support, and the driven gear is a crown gear coaxial with the coupling means.

16. A torque booster for operating a valve during initial opening and closing movements thereof, comprising:
   a rotatable valve operating stem,
   a rotatable operator shaft,
   a gear reduction unit rotatable with the shaft whenever the latter is rotated,
   a driving gear rotatable by the gear reduction unit at fraction of the speed of rotation of the operator shaft,
   a coupling means including a driver coupling element rotatable with the operator shaft whenever the latter is rotated, and a driven coupling element rotatable with the valve operating stem, the two coupling elements being slidable and rotatable with respect to each other,
   a driven gear rotatable with the driven coupling element, the driven gear being adapted to mesh with the driving gear, and
   means forming part of the coupling for sliding the driven coupling element axially in one direction with respect to the driving coupling element, during initial rotation of the operator shaft, to mesh the driving and driven gears, so as to cause the valve operating stem to rotate at a fraction of the speed of rotaation of the operator shaft, said means being responsive to further rotation of the operator shaft for sliding the driven coupling element axially in the opposite direction to disengage the driving and driven gears and to transmit the rotary motion of the operator shaft to the operating stem at an increased speed of rotation.

17. A torque booster as defined in claim 16 wherein the driving and driven gears are crown gears.

* * * * *